(12) United States Patent
Pien et al.

(10) Patent No.: US 10,870,369 B2
(45) Date of Patent: Dec. 22, 2020

(54) BATTERY THERMAL MANAGEMENT ASSEMBLY AND METHOD

(71) Applicant: Ford Global Technologies, LLC, Dearborn, MI (US)

(72) Inventors: Stephen Pien, Farmington Hills, MI (US); Andrew Charles Samyn, Dearborn, MI (US); Erik Billimoria, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 16/124,298

(22) Filed: Sep. 7, 2018

(65) Prior Publication Data

US 2020/0079224 A1 Mar. 12, 2020

(51) Int. Cl.
| | |
|---|---|
| *B60K 1/04* | (2019.01) |
| *B60K 6/28* | (2007.10) |
| *B62D 33/02* | (2006.01) |
| *H01M 10/613* | (2014.01) |
| *H01M 10/625* | (2014.01) |
| *H01M 10/6568* | (2014.01) |

(Continued)

(52) U.S. Cl.
CPC ............... *B60L 58/26* (2019.02); *B60K 1/04* (2013.01); *B60K 6/28* (2013.01); *B62D 33/023* (2013.01); *H01M 10/613* (2015.04); *H01M 10/625* (2015.04); *H01M 10/6568* (2015.04); *B60K 2001/003* (2013.01); *B60K 2001/005* (2013.01); *B60K 2001/0416* (2013.01); *B60K 2001/0438* (2013.01); *B60K 2001/0444* (2013.01); *B60Y 2200/91* (2013.01); *B60Y 2200/92* (2013.01); *B60Y 2306/05* (2013.01); *H01M 2220/20* (2013.01)

(58) Field of Classification Search
CPC ... B60L 58/26; H01M 10/613; H01M 10/625; H01M 10/6568; B60K 1/04; B60K 6/28; B60K 2001/005; B60K 2001/003; B60K 2001/0405; B60K 2001/0416; B60K 2001/0438; B60K 2001/0444; B62D 33/023
USPC ..................................................... 165/41–44
See application file for complete search history.

(56) References Cited

U.S. PATENT DOCUMENTS 4,454,837 A * 6/1984 Luebke ..................... B60P 3/04
119/401
5,848,744 A 12/1998 Dischner et al.
(Continued)

FOREIGN PATENT DOCUMENTS

CN 204927377 12/2015
JP 3950412 8/2007

*Primary Examiner* — Joel M Attey
(74) *Attorney, Agent, or Firm* — David Kelley, Esq.; Carlson, Gaskey & Olds, P.C.

(57) ABSTRACT

An exemplary vehicle assembly includes, among other things, inner and outer panels of a cargo bed, and a heat exchange module that manages thermal energy levels of a traction battery. The heat exchange module is disposed within a chamber between the inner and outer panels. An exemplary thermal management method includes, among other things, managing thermal energy within a traction battery by exchanging thermal energy between a first fluid and a second fluid at a heat exchange module. The heat exchange module is disposed within a chamber between inner and outer panels of a cargo bed.

22 Claims, 3 Drawing Sheets

(51) Int. Cl.
  *B60L 58/26* (2019.01)
  *B62D 33/023* (2006.01)
  *B60K 1/00* (2006.01)

(56) References Cited

U.S. PATENT DOCUMENTS

| | | | |
|---|---|---|---|
| 6,660,967 B2 | 12/2003 | Brofft et al. | |
| 2014/0216709 A1* | 8/2014 | Smith | B60H 1/00278 165/287 |
| 2017/0008375 A1* | 1/2017 | Blatchley | B60H 1/2218 |

* cited by examiner

BATTERY THERMAL MANAGEMENT ASSEMBLY AND METHOD

TECHNICAL FIELD

This disclosure relates generally to an assembly that manages thermal energy levels of a traction battery and, more particularly, to packaging portions of the assembly between an inner and outer panel of a vehicle cargo bed.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Traction batteries of electrified vehicles typically include a plurality of arrays each having individual battery cells that are periodically recharged to replenish the energy necessary to power the electric machines. Battery cells can heat up during charging and discharging, and during other stages of operation. Operating the battery cells at certain temperatures can improve the capacity and the life of the battery cells. Managing thermal energy levels of the traction battery can facilitate efficient operation.

SUMMARY

A vehicle assembly according to an exemplary aspect of the present disclosure includes, among other things, inner and outer panels of a cargo bed, and a heat exchange module that manages thermal energy levels of a traction battery. The heat exchange module is disposed within a chamber between the inner and outer panels.

In a further non-limiting embodiment of the foregoing assembly, the heat exchange module is a liquid-to-air heat exchange module.

A further non-limiting embodiment of any of the foregoing assemblies includes a fan that communicates a flow of air through the heat exchange module, the fan disposed within the chamber.

A further non-limiting embodiment of any of the foregoing assemblies includes a pump that moves a liquid to the heat exchange module, the pump disposed outside the chamber.

A further non-limiting embodiment of any of the foregoing assemblies includes an inlet that communicates a flow of air to the chamber. The inlet opens to a horizontally facing side of a vehicle having the cargo bed.

A further non-limiting embodiment of any of the foregoing assemblies includes an outlet that communicates the flow of air from the chamber. The outlet opens to a downwardly facing side of the vehicle.

A further non-limiting embodiment of any of the foregoing assemblies includes at least one louver moveable back and forth between a first position that permits more flow through the inlet and a second position that permits less flow through the inlet.

In a further non-limiting embodiment of any of the foregoing assemblies, the inlet additionally opens to a front end of the vehicle.

In a further non-limiting embodiment of any of the foregoing assemblies, the chamber is forward of a wheel well and aft of a passenger cabin.

In a further non-limiting embodiment of any of the foregoing assemblies, the chamber is a first chamber on a driver side of the vehicle and the heat exchange module is a first heat exchange module. The vehicle further including a second heat exchange module disposed within a second chamber between inner and outer panels of the cargo bed on a passenger side of the vehicle.

A thermal management method according to another exemplary aspect of the present disclosure includes, among other things, managing thermal energy within a traction battery by exchanging thermal energy between a first fluid and a second fluid at a heat exchange module. The heat exchange module is disposed within a chamber between inner and outer panels of a cargo bed.

A further non-limiting embodiment of the foregoing method includes heating the first fluid with thermal energy from the traction battery, and cooling the first fluid at the heat exchange module.

In a further non-limiting embodiment of the foregoing method, the chamber is forward of a wheel well and aft of a passenger cabin.

In a further non-limiting embodiment of any of the foregoing methods, the first fluid is liquid and the second fluid is air.

A further non-limiting embodiment of any of the foregoing methods includes moving the second fluid through the heat exchange module using a fan that is disposed within the chamber.

A further non-limiting embodiment of any of the foregoing methods includes moving the first fluid through the heat exchange module using a pump that is disposed outside the chamber.

A further non-limiting embodiment of any of the foregoing methods includes moving the second fluid to the heat exchange module through an inlet that opens to a horizontally facing side of a vehicle having the cargo bed.

A further non-limiting embodiment of any of the foregoing methods includes controlling a flow of the second fluid to the heat exchange module by moving at least one louver between a first position that permits more flow through the inlet to the heat exchange module and a second position that permits less flow through the inlet to the heat exchange module.

In a further non-limiting embodiment of any of the foregoing methods, the inlet additionally opens to a front of the vehicle.

A further non-limiting embodiment of any of the foregoing methods includes venting the second fluid from the heat exchange module through an outlet that opens to a downwardly facing side of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a thermal management assembly for an electrified vehicle. The thermal management assembly includes a heat exchange module packaged between inner and outer panels of a cargo bed. These and other features of this disclosure are described in greater detail in the following paragraphs of this detailed description.

Figure 1:
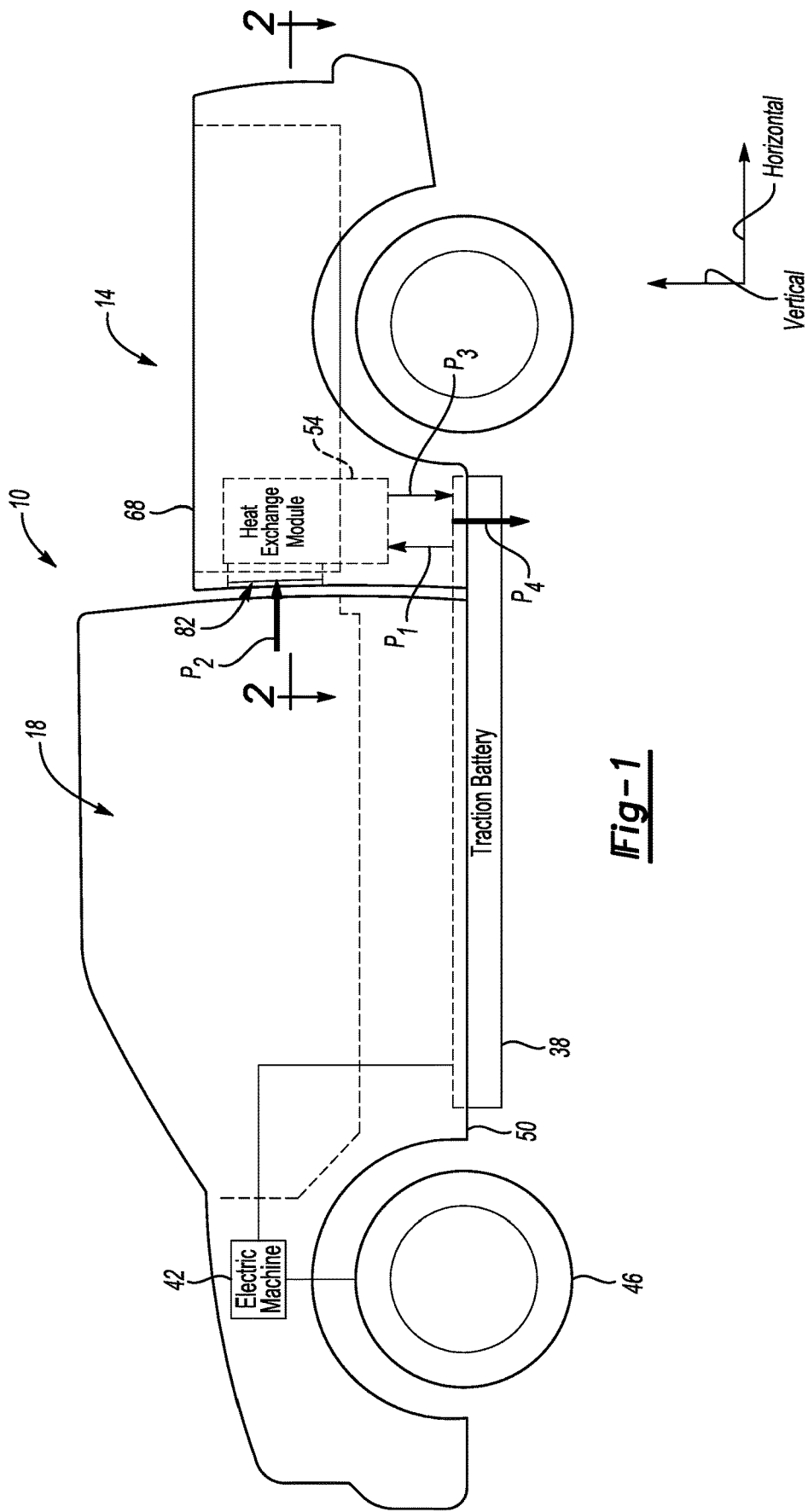
FIG. 1 illustrates a schematic side view of an electrified vehicle equipped with a cargo bed for storing and hauling cargo.

FIG. 1 schematically illustrates a vehicle 10 including a cargo bed 14. In the illustrated embodiment, the vehicle 10 is a pickup truck. While a truck is pictured, vehicles other than trucks could also benefit from the teachings of this disclosure.

The cargo bed 14 establishes a cargo space for storing and hauling cargo with the vehicle 10. The example cargo bed 14 is rearward of a passenger cabin 18 of the vehicle 10.

Figure 2:
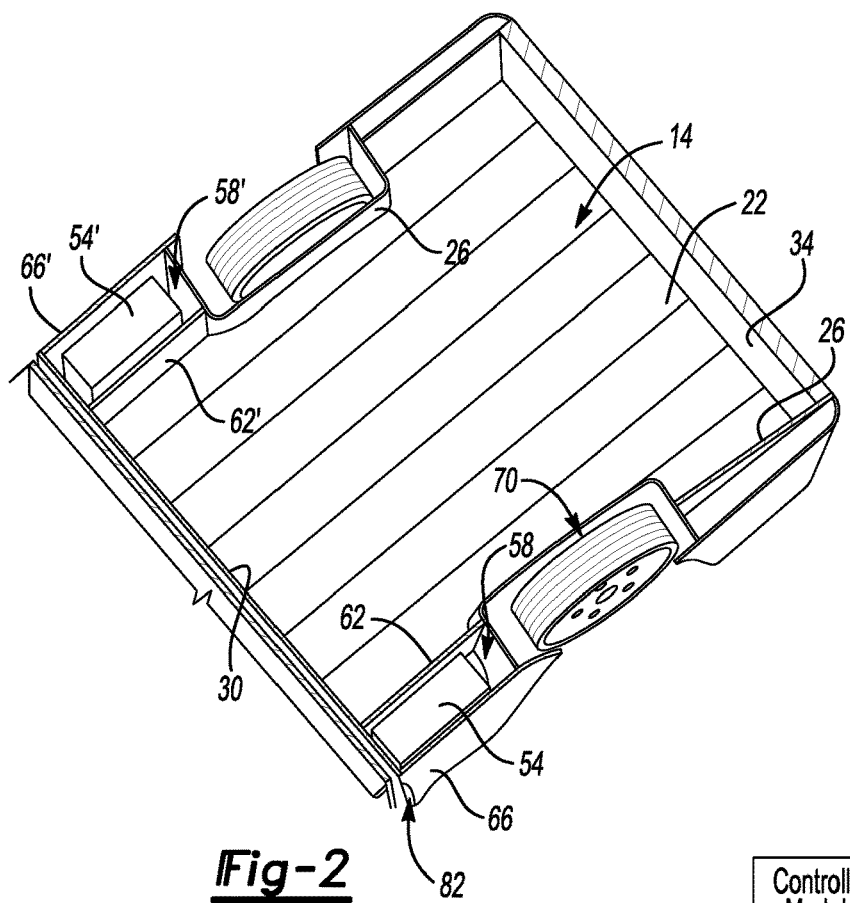
FIG. 2 illustrates a section taken at line 2-2 in FIG. 1.

With reference now to FIG. 2 and continued reference to FIG. 1, the cargo bed 14 includes a floor 22 extending between a pair of longitudinally extending sidewalls 26. A front of the cargo bed 14 is provided by a front wall 30 that is aft the passenger compartment 18. A rear of the cargo bed 14 is provided by a tailgate 34.

The vehicle 10 further includes a traction battery 38, at least one electric machine 42, and a plurality of drive wheels 46. When powered, the electric machine 42 can drive the drive wheels 46 to move the vehicle 10. The electric machine 42 can receive electric power from the traction battery 38. The electric machine 42 converts the electric power to torque to drive the drive wheels 46. The example traction battery 38 is considered a relatively high-voltage battery.

The example vehicle 10 is an all-electric vehicle. In other examples, the vehicle 10 is a hybrid electric vehicle, which selectively drives wheels using torque provided by an internal combustion engine instead of, or in addition to, the electric machine. Generally, the vehicle 10 can be any type of vehicle having a traction battery.

The vehicle 10 includes an underbody structure 50, which faces vertically downward. The traction battery 38 is mounted to the underbody structure 50 in a position vertically below the passenger cabin 18 and, in this example, vertically below the cargo bed 14. The vehicle 10 also includes horizontally facing sides and a downwardly facing side. Vertical and horizontal, for purposes of this disclosure, refer to the general orientation of the vehicle 10 with respect to ground during ordinary operation of the vehicle 10.

The vehicle 10 includes a thermal management assembly that is used to, among other things, manage thermal energy levels of the traction battery 38. Managing thermal energy levels can facilitate efficient operation of the traction battery 38. One component of the thermal management assembly is a heat exchange module 54.

For purposes of this disclosure, the heat exchange module 54 is described as being used to manage thermal energy levels of the traction battery 38 of the all-electric vehicle. The vehicle including the traction battery 38 could instead be a hybrid electric vehicle (HEV), a plug-in hybrid electric vehicles (PHEV), or another type of electric vehicle. The heat exchange module 54 could be used to manage thermal energy levels of components other than a traction battery, such as for rear axle cooling. The heat exchange module 54, in such examples, could be used in conventional vehicles that do not include a traction battery.

Figure 3:
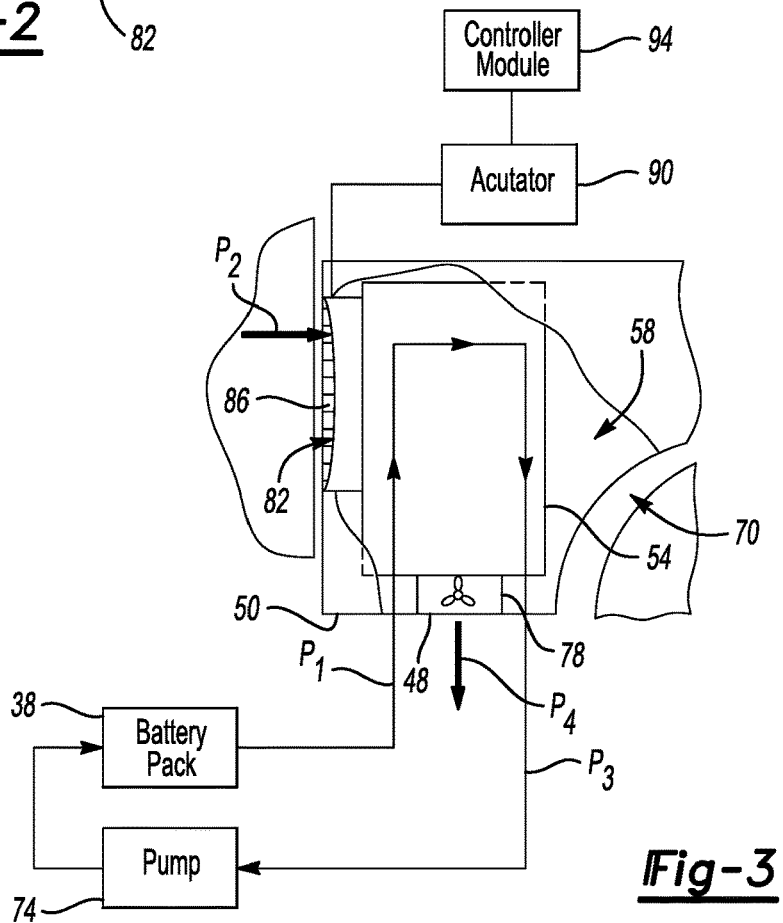
FIG. 3 illustrates a close-up view of an area of the vehicle of FIG. 1 with selected portions cut away to show a heat exchange module disposed between inner and outer panels of the cargo bed.

Referring now to FIG. 3, with continued reference to FIGS. 1 and 2, a first fluid moves from the traction battery 38 to the heat exchange module 54 along a path $P_1$. The first fluid moved along the path $P_1$ can be a liquid coolant that, prior to moving along the path $P_1$ is circulated through the traction battery 38 where the first fluid is heated with thermal energy from the traction battery 38. In this example, the first fluid is water. A second fluid, here, a flow of air, moves to the heat exchange module 54 along a path $P_2$.

Within the heat exchange module 54, thermal energy is exchanged between the first fluid and the second fluid. The heat exchange module 54 refers to module of the thermal management assembly where thermal energy is exchanged between the first fluid and the second fluid. The exchange could include thermal energy passing from the first fluid to the second fluid, which cools the first fluid. The exchange could include thermal energy passing from the second fluid to the first fluid, which cools the second fluid.

In this example, the first fluid is cooled by the second fluid within the heat exchange module 54. The heat exchange module 54 could include a bundle of tubes for communicating the first fluid through the heat exchange module 54. The second fluid, which is the flow of air in this example, is passed over the bundle of tubes. Within the heat exchange module 54, thermal energy from the first fluid communicating through the bundle of tubes passes from the first fluid to the second fluid.

The first fluid, which has been cooled at the heat exchange module 54, can then move back to the traction battery 38 along path $P_3$. The second fluid, which has been heated at the heat exchange module 54 by the first fluid, exits the heat exchange module 54 along path $P_4$.

The heat exchange module 54 is held within a chamber 58 that is between an inner panel 62 and an outer panel 66 of the sidewall 26 on a driver's side of the vehicle 10. Inner and outer, for purposes of the panels in this disclosure, is with reference to the cargo bed 14. The inner panels 62 and the outer panel 66 are both exposed and visible, but this is not required. That is, the inner panel 62 does not have to be the innermost panel, nor does the outer panel 66 have to be the outermost panel. The inner panel 62 and outer panel 66 are both sheet metal in this example, but could have other material compositions.

A side rail cover 68 can enclose the heat exchange module 54 within the chamber 58. The side rail cover 68 could be selectively removable so that the heat exchange module 54 can be serviced and maintained. The underbody 50 provides a floor of the chamber 58.

The heat exchange module 54 is held within the chamber 58 at a position that is aft of the front wall 30 and forward a wheel well area 70 of the vehicle 10. In another example, the heat exchange module 54 could be aft the wheel well area 70.

The heat exchange module 54 is a first heat exchange module. The thermal management assembly for the vehicle 10 can further include a second heat exchange module 54' packaged within a chamber 58' provided between an inner panel 62' and an outer panel 66' of the sidewall 26 on a passenger side of the vehicle 10.

A pump 74, or pumps, can be used to move the first fluid along the path $P_1$ to the heat exchange module 54 and from the heat exchange module 54 along the path $P_3$. The pump 74 can be packaged outside of the chamber 58 in another area of the vehicle 10.

A fan 78, or fans, can be used to move the second fluid along the path $P_2$ through the heat exchange module 54 and along the path $P_4$ from the heat exchange module 54. The fan 78, in the exemplary embodiment, is disposed within the chamber 58. The fan 78 could be upstream from where thermal energy is exchanged between the first fluid and the second fluid. The fan 78, in such an example, is used to push air through the heat exchange module 54. The fan 78 could be downstream from where thermal energy is exchanged between the first fluid and the second fluid. The fan 78, in such an example, is used to pull air through the heat exchange module 54. The fan 78 could also include a combination of an upstream fan and a downstream fan.

An inlet 82 provides an opening for the second fluid to move along the path $P_2$ to the heat exchange module 54. The inlet 82 opens to a horizontally facing side of the vehicle 10 and to a front end of the vehicle 10. The inlet 82 can face at least partially forward relative to the orientation of the vehicle 10. Accordingly, as the vehicle 10 is driven forward, air is directed to the inlet 82.

In another example, the inlet 82 could instead, or additionally, open vertically upwards such that the second fluid moves vertically downward to the heat exchange module 54. The inlet 82 that opens vertically upward could be provided within the side rail cover 68.

In yet another example, the inlet 82 could open into the cargo bed 14 such that the second fluid is moved to the heat exchange module 54 from the cargo bed 14. The inlet 82 that opens into the cargo bed 14 could be provided within the inner panel 62.

Figure 4:
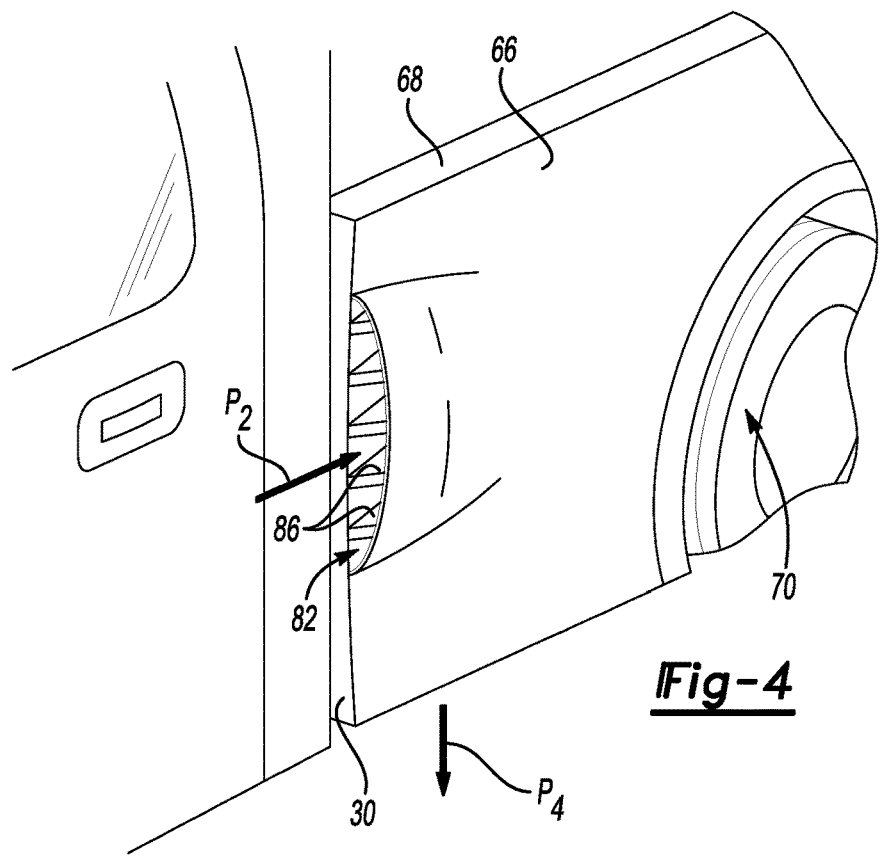
FIG. 4 illustrates a perspective view of the area shown in FIG. 3 with an inlet to the heat exchange module having louvers in a first position that permits more flow through the inlet.
Figure 5:
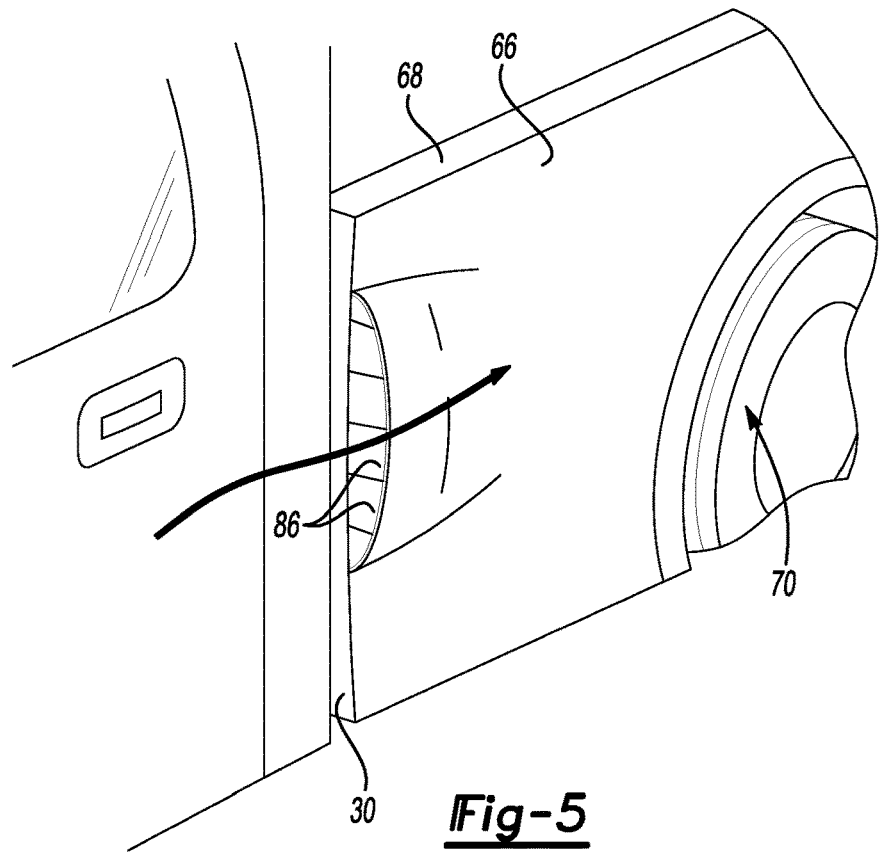
FIG. 5 illustrates the view of FIG. 5 having louvers in a second position that permits less flow through the inlet.

In the exemplary embodiment, a plurality of louvers 86 are moveable between the position of FIG. 4, which permits flow along the path $P_2$ to the heat exchange module 54, and the position of FIG. 5 where the louvers 86 block flow through the inlet 82.

An actuator 90 and controller module 94 can be incorporated within the vehicle 10 to move the louvers 86. The controller module 94 can command the actuator 90 to move the louvers 86 from the position of FIG. 4 to the position of FIG. 5, or vice versa.

The controller module 94 can be a microcontroller unit (MCU). The controller module 94 could include a single controller module, or selected portions of a plurality of different controller modules. The controller module 94 could be, or could include, an engine control unit (ECU) of the vehicle 10.

The controller module 94 can include, among other things, a processor and a memory portion. The processor can be programmed to execute a program stored in the memory portion. The processor can be a custom made or commercially available processor, a central processing unit (CPU), an auxiliary processor among several processors associated with the controller module 94, a semiconductor based microprocessor (in the form of a microchip or chipset) or generally any device for executing software instructions.

The memory portion can include any one or combination of volatile memory elements. Programs can be stored in the memory portion as software code and used to selectively open and control the louvers 86 as required. The programs can include one or more additional or separate programs, each of which includes an ordered list of executable instructions for implementing logical functions associated with commanding the actuator 90 to move the louvers 86.

In an exemplary non-limiting embodiment, the controller module 94 assesses that cooling the traction battery 38 is desired. The assessment can be based, for example, on a temperature reading from a temperature sensor associated with the traction battery 38. The traction battery 38 can heat up and require cooling when the vehicle 10 is towing a load, for example.

To begin cooling the traction battery 38, the controller module 94 commands the actuator 90 to move the louvers 86 to the position of FIG. 4. In the position of FIG. 4, the louvers 86 permit the flow of the second fluid along the path $P_2$ into the heat exchange module 54. The flow of the second fluid can take on thermal energy from the first fluid to cool the traction battery.

If cooling the traction battery 38 utilizing the heat exchange module 54 is not desired, the controller module 94 can command the actuator 90 to move the louvers 86 to the position of FIG. 5.

Notably, an outlet 98 from the heat exchange module 54 opens to the downwardly facing underbody structure 50 of the vehicle. This ensures that the second fluid, which may be heated after passing through the heat exchange module 54, is not directed into the cargo bed 14.

Features of the exemplary embodiments can include packaging a heat exchange module of a thermal management system between panels of a cargo bed of the vehicle rather than, for example, at a front end of the vehicle behind a front grille. Packaging the heat exchange module between the panels of the cargo bed can provide additional front storage space for a vehicle. Further, the heat exchange module packaged between the panels is substantially hidden from view, which reduces the visual impact of the heat exchange module.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
    inner and outer panels of a cargo bed;
    a heat exchange module that manages thermal energy levels of a traction battery, the heat exchange module disposed within a chamber between the inner and outer panels; and
    an outlet that communicates the flow of air from the chamber, the outlet opening to a downwardly facing side of the vehicle.

2. The vehicle assembly of claim 1, wherein the heat exchange module is a liquid-to-air heat exchange module.

3. The vehicle assembly of claim 1, further comprising a fan that communicates a flow of air through the heat exchange module, the fan disposed within the chamber.

4. The vehicle assembly of claim 1, further comprising a pump that moves a liquid to the heat exchange module, the pump disposed outside the chamber.

5. The vehicle assembly of claim 1, further comprising an inlet that communicates a flow of air to the chamber, the inlet opening to a horizontally facing side of a vehicle having the cargo bed.

6. The vehicle assembly of claim 5, further comprising at least one louver moveable back and forth between a first position that permits more flow through the inlet and a second position that permits less flow through the inlet.

7. The vehicle assembly of claim 5, wherein the inlet additionally opens to a front end of the vehicle.

8. The vehicle assembly of claim 1, wherein the chamber is forward of a wheel well and aft of a passenger cabin.

9. The vehicle assembly of claim 1, wherein the chamber is a first chamber on a driver side of the vehicle and the heat exchange module is a first heat exchange module, the vehicle further including a second heat exchange module disposed within a second chamber between inner and outer panels of the cargo bed on a passenger side of the vehicle.

10. A vehicle assembly, comprising:
inner and outer panels of a cargo bed;
a heat exchange module that manages thermal energy levels of a traction battery, the heat exchange module disposed within a chamber between the inner and outer panels;
an inlet that communicates a flow of air to the chamber, the inlet opening to a horizontally facing side of a vehicle having the cargo bed; and
an outlet that communicates the flow of air from the chamber, the outlet opening to a downwardly facing side of the vehicle.

11. The vehicle assembly of claim 10, wherein the heat exchange module is a liquid-to-air heat exchange module.

12. The vehicle assembly of claim 10, further comprising a fan that communicates a flow of air through the heat exchange module, the fan disposed within the chamber.

13. The vehicle assembly of claim 10, further comprising a pump that moves a liquid to the heat exchange module, the pump disposed outside the chamber.

14. The vehicle assembly of claim 10, further comprising at least one louver moveable back and forth between a first position that permits more flow through the inlet and a second position that permits less flow through the inlet.

15. The vehicle assembly of claim 10, wherein the inlet additionally opens to a front end of the vehicle.

16. The vehicle assembly of claim 10, wherein the chamber is forward of a wheel well and aft of a passenger cabin.

17. The vehicle assembly of claim 10, wherein the chamber is a first chamber on a driver side of the vehicle and the heat exchange module is a first heat exchange module, the vehicle further including a second heat exchange module disposed within a second chamber between inner and outer panels of the cargo bed on a passenger side of the vehicle.

18. A vehicle assembly, comprising:
a cargo bed of a pickup truck;
a sidewall of the cargo bed, the sidewall extending longitudinally from a front wall of the cargo bed to a tailgate of the cargo bed; and
a heat exchange module that manages thermal energy levels of a traction battery, the heat exchange module disposed within a chamber between an inner panel and an outer panel, of the sidewall;
an inlet that communicates a flow of air to the chamber, the inlet provided by the sidewall; and
an outlet that communicates the flow of air from the chamber, the outlet opening to a downwardly facing side of the vehicle.

19. The vehicle assembly of claim 15, further comprising a side rail cover that encloses the heat exchange module within the chamber.

20. The vehicle assembly of claim 16, wherein the inlet is provided within the sidewall.

21. The vehicle assembly of claim 15, wherein the inlet opens into the cargo bed, wherein the inlet is provided by the inner panel.

22. The vehicle assembly of claim 15, wherein the inlet opens to a horizontally facing side of the vehicle, wherein the inlet is provided by the inner panel.

* * * * *